(12) United States Patent
Ylitie et al.

(10) Patent No.: US 10,984,049 B2
(45) Date of Patent: Apr. 20, 2021

(54) PERFORMING TRAVERSAL STACK COMPRESSION

(71) Applicant: NVIDIA Corporation, Santa Clara, CA (US)

(72) Inventors: Henri Johannes Ylitie, Ususimaa (FI); Tero Tapani Karras, Helsinki (FI); Samuli Matias Laine, Vantaa (FI)

(73) Assignee: NVIDIA CORPORATION, Santa Clara, CA (US)

( * ) Notice: Subject to any disclaimer, the term of this patent is extended or adjusted under 35 U.S.C. 154(b) by 450 days.

(21) Appl. No.: 15/880,459

(22) Filed: Jan. 25, 2018

(65) Prior Publication Data

US 2018/0373809 A1    Dec. 27, 2018

Related U.S. Application Data

(60) Provisional application No. 62/525,648, filed on Jun. 27, 2017.

(51) Int. Cl.
| | |
|---|---|
| *G06F 16/00* | (2019.01) |
| *G06F 16/901* | (2019.01) |
| *G06T 15/06* | (2011.01) |
| *G06F 7/78* | (2006.01) |

(52) U.S. Cl.
CPC ............ *G06F 16/9027* (2019.01); *G06F 7/78* (2013.01); *G06T 15/06* (2013.01)

(58) Field of Classification Search
CPC .............................. G06F 16/22; G06F 16/2246
See application file for complete search history.

(56) References Cited

U.S. PATENT DOCUMENTS

| 8,502,819 B1* | 8/2013 | Aila | G06T 15/06 345/419 |
|---|---|---|---|
| 2014/0285488 A1* | 9/2014 | Sevastiyanov | G06T 15/06 345/426 |
| 2015/0348308 A1* | 12/2015 | Lee | G06T 15/06 345/426 |
| 2016/0071313 A1* | 3/2016 | Laine | G06T 15/10 345/419 |
| 2017/0178387 A1* | 6/2017 | Woop | G06T 15/005 |

OTHER PUBLICATIONS

Aila et al., "Architecture Considerations for Tracing Incoherent Rays," High Performance Graphics, 2010, 10 pages.
Hapala et al., "Efficient Stack-less BVH Traversal for Ray Tracing," SCCG, 2011, pp. 29-34.
Afra et al., "Stackless Multi-BVH Traversal for CPU, MIC and GPU Ray Tracing," Computer Graphics Forum, 2013, pp. 1-11.
(Continued)

*Primary Examiner* — Khanh B Pham
(74) *Attorney, Agent, or Firm* — Zilka-Kotab, P.C.

(57) ABSTRACT

A method, computer readable medium, and system are disclosed for performing traversal stack compression. The method includes traversing a hierarchical data structure having more than two children per node, and during the traversing, creating at least one stack entry, utilizing a processor, where each stack entry contains a plurality of intersected nodes, and adding the at least one stack entry to a compressed traversal stack stored in a memory, utilizing the processor.

20 Claims, 14 Drawing Sheets

(56) References Cited

OTHER PUBLICATIONS

Aila et al., "Understanding the Efficiency of Ray Traversal on GPUs," Proceedings of High Performance Graphics, 2009, 5 pages retrieved from https://users.aalto.fi/~laines9/publications/aila2009hpg_paper.pdf.
Aila et al., "Understanding the Efficiency of Ray Traversal on GPUs—Kepler and Fermi Addendum," NVIDIA Technical Report NVR-2012-02, 2012, pp. 1-4 retrieved from https://users.aalto.fi/~laines9/publications/aila2012tr1_paper.pdf.
Garanzha et al., "Fast Ray Sorting and Breadth-First Packet Traversal for GPU Ray Tracing," Eurographics, vol. 29, No. 2, 2010, 10 pages.
Keely, S., "Reduced Precision for Hardware Ray Tracing in GPUs," High Performance Graphics, 2014, pp. 29-40.
Mahovsky et al., "Memory-Conserving Bounding Volume Hierarchies with Coherent Ray Tracing," IEEE Transactions on Visualization and Computer Graphics, 2006, pp. 1-8.
Segovia et al., "Memory Efficient Ray Tracing with Hierarchical Mesh Quantization," Graphics Interface, 2010, pp. 153-160.
Vaidyanathan et al., "Watertight Ray Traversal with Reduced Precision," High Performance Graphics, 2016, 8 pages.
Goldsmith et al., "Automatic Creation of Object Hierarchies for Ray Tracing," IEEE Computer Graphics and Applications, vol. 7, No. 5, May 1987, pp. 14-20.
Pinto, A.S., "Adaptive Collapsing on Bounding Volume Hierarchies for Ray-Tracing," Eurographics, Short Paper, 2010, pp. 1-4.
Stich et al., "Spatial Splits in Bounding Volume Hierarchies," Proceedings of High Performance Graphics, 2009, pp. 7-14.

\* cited by examiner

PERFORMING TRAVERSAL STACK COMPRESSION

CLAIM OF PRIORITY

This application claims the benefit of U.S. Provisional Application No. 62/525,648 titled "COMPRESSED, SELF-CONTAINED TRAVERSAL STACK FOR BVH-ACCELERATED RAY TRACING," filed Jun. 27, 2017, the entire contents of which is incorporated herein by reference.

FIELD OF THE INVENTION

The present invention relates to ray tracing, and more particularly to implementing a ray traversal algorithm that operates on a compressed traversal stack.

BACKGROUND

Traversal of hierarchical data structures is commonly performed during various operations (e.g., ray tracing, collision detection, etc.). However, a large portion of available memory bandwidth on a processor is used by memory traffic to and from conventional traversal stacks (in which nodes are individually stored within the stack).

Thus, there is a need for addressing these issues and/or other issues associated with the prior art.

SUMMARY

A method, computer readable medium, and system are disclosed for performing traversal stack compression. The method includes traversing a hierarchical data structure having more than two children per node, and during the traversing, creating at least one stack entry, utilizing a processor, where each stack entry contains a plurality of intersected nodes, and adding the at least one stack entry to a compressed traversal stack stored in a memory, utilizing the processor.

DETAILED DESCRIPTION

Figure 1:
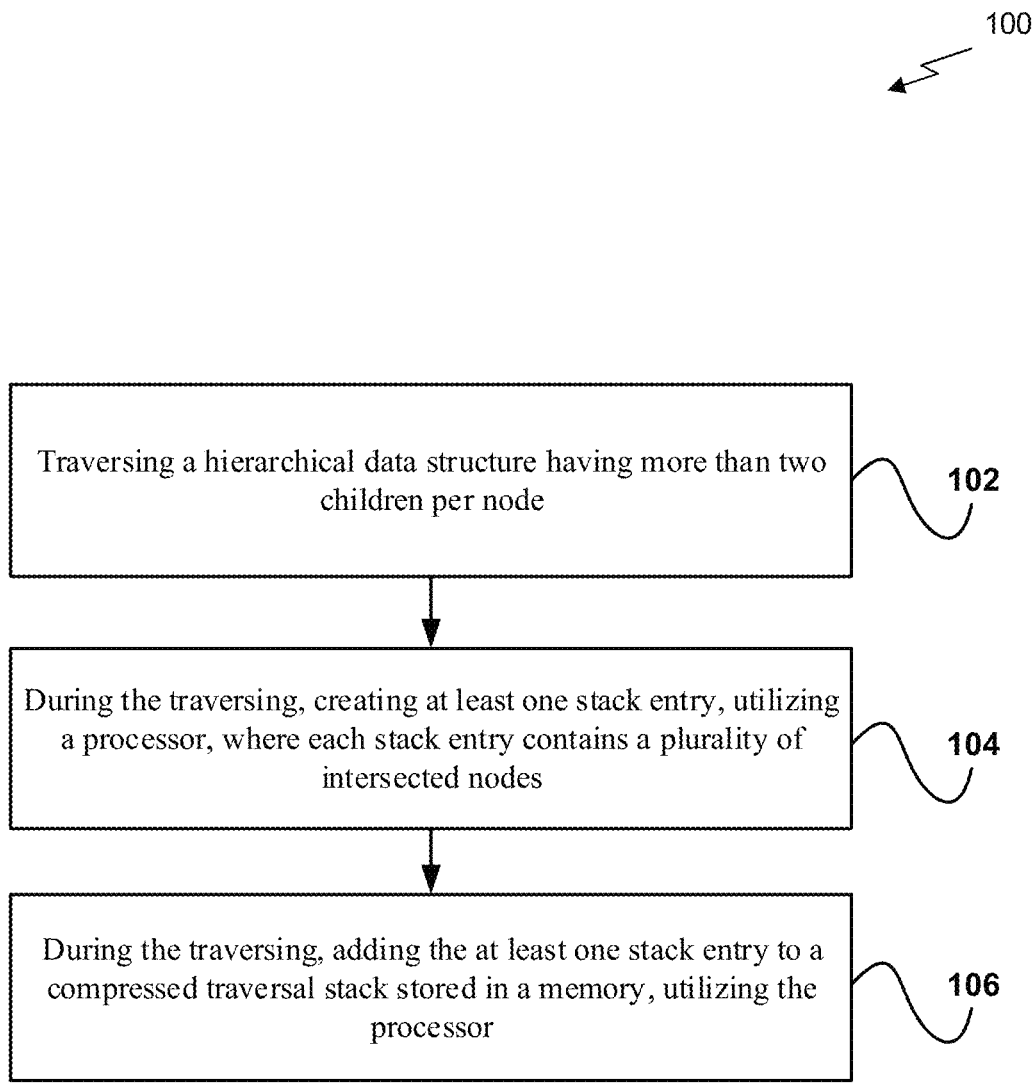
FIG. 1 illustrates a flowchart of a method for performing traversal stack compression, in accordance with one embodiment.

FIG. 1 illustrates a flowchart of a method 100 for performing traversal stack compression, in accordance with one embodiment. As shown in operation 102, a hierarchical data structure having more than two children per node is traversed. In one embodiment, the hierarchical data structure may include a bounding volume hierarchy (BVH) such as a wide BVH, an octree, etc. In another embodiment, the hierarchical data structure may be traversed as part of one or more operations (e.g., a ray tracing operation, as part of a collision detection operation, etc.).

Additionally, as shown in operation 104, during the traversing, at least one stack entry is created utilizing a processor, where each stack entry contains a plurality of intersected nodes. In one embodiment, the intersected nodes may include sibling nodes. In another embodiment, the intersected nodes may be determined by selecting a node, and intersecting bounding boxes of all children in the node.

For example, the node may be selected from a current node group. In another example, the node may be selected based on a predetermined traversal order. Of course, however, the node may be selected according to any methodology.

Further, in one embodiment, the at least one stack entry may be created in a complex form (e.g., in a compressed format, etc.). In another embodiment, a plurality of different stack entries may be created during the traversal of the hierarchical data structure. For example, a single stack entry may represent an internal node group (e.g., one or more internal nodes referenced by the same parent). In another example, a single stack entry may represent a primitive node group (e.g., one or more primitives (leaf nodes) referenced by one internal node, etc.). In yet another example, a stack entry may be created for each distinct primitive type that is intersected during the traversal. For instance, the primitive types may include one or more of triangles, user defined abstract primitives, spheres, quadrangles, etc.

Further still, in one embodiment, each individual stack entry may include a base index to a node within the hierarchical data structure. In another embodiment, each individual stack entry may include a bit mask that indicates which of the plurality of intersected nodes have not yet been processed. In yet another embodiment, each individual stack entry may represent an internal node group, and may include a field indicating the type of each child. In still another embodiment, each individual stack entry may represent an internal node group, and may include a field that represents children to be traversed in a predetermined traversal order.

Further, as shown in operation 106, during the traversing, the at least one stack entry is added to a compressed traversal stack stored in a memory, utilizing the processor. In one embodiment, the memory may include a shared memory (e.g., SM-local shared memory, etc.). In another embodiment, the memory may include thread-local memory. In yet another embodiment, each individual stack entry may be stored as an individual entry within the compressed traversal stack.

In this way, the stack may be compressed, and memory traffic involving the compressed stack may be reduced, which may increase an available processing memory bandwidth. More specifically, instead of storing each intersected node as individual entries in the stack, a plurality of intersected nodes may be stored in the stack as a single entry, which reduces a size of the stack (which in turn reduces memory usage), as well as memory bandwidth used to add to and pull from the stack. This may increase the performance of a system performing hierarchical data structure traversal.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
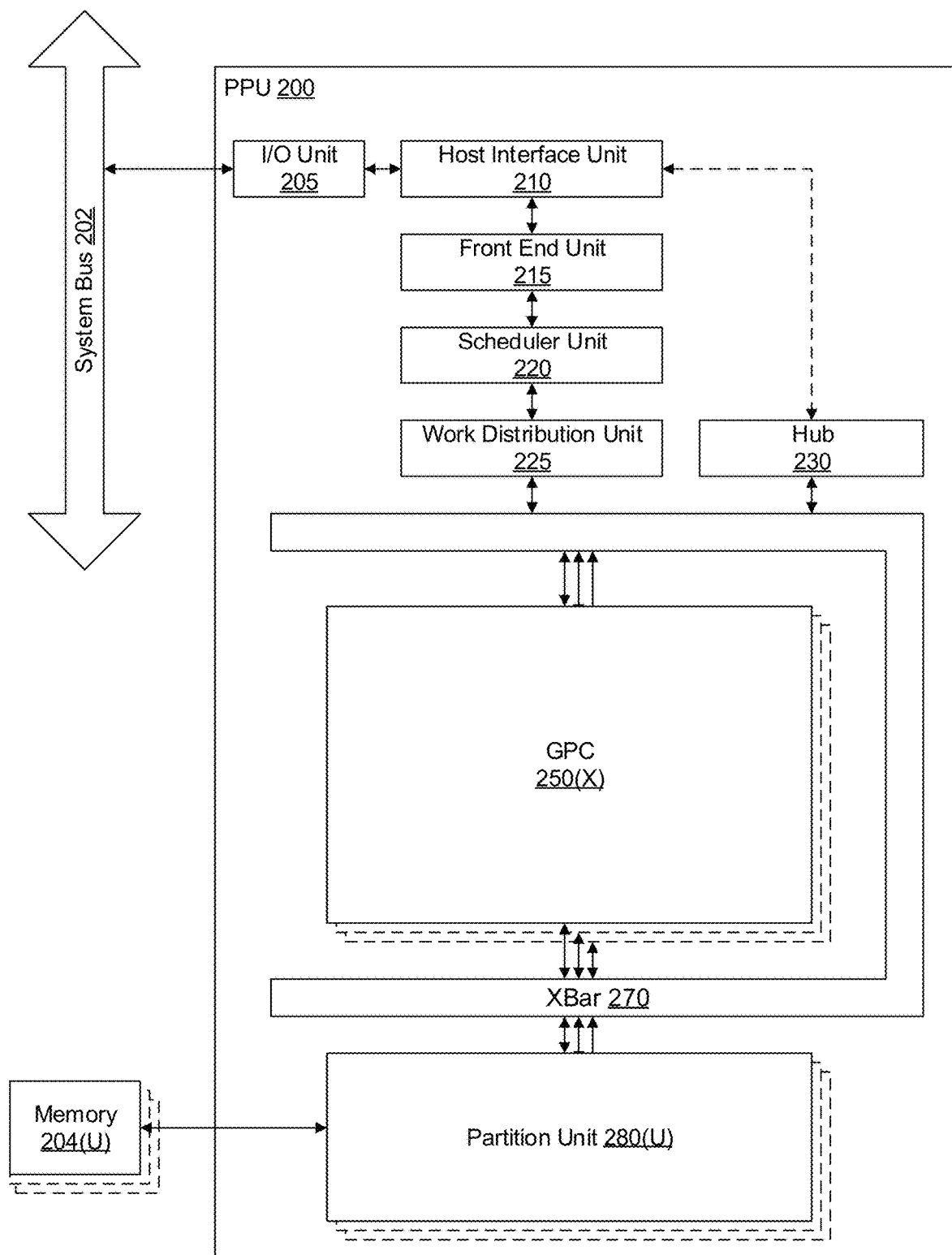
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via Xbar 270. The Xbar 270 is an interconnect network that couples many of the units of the PPU 200 to other units of the PPU 200. For example, the Xbar 270 may be configured to couple the work distribution unit 225 to a particular GPC 250. Although not shown explicitly, one or more other units of the PPU 200 are coupled to the host unit 210. The other units may also be connected to the Xbar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the Xbar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
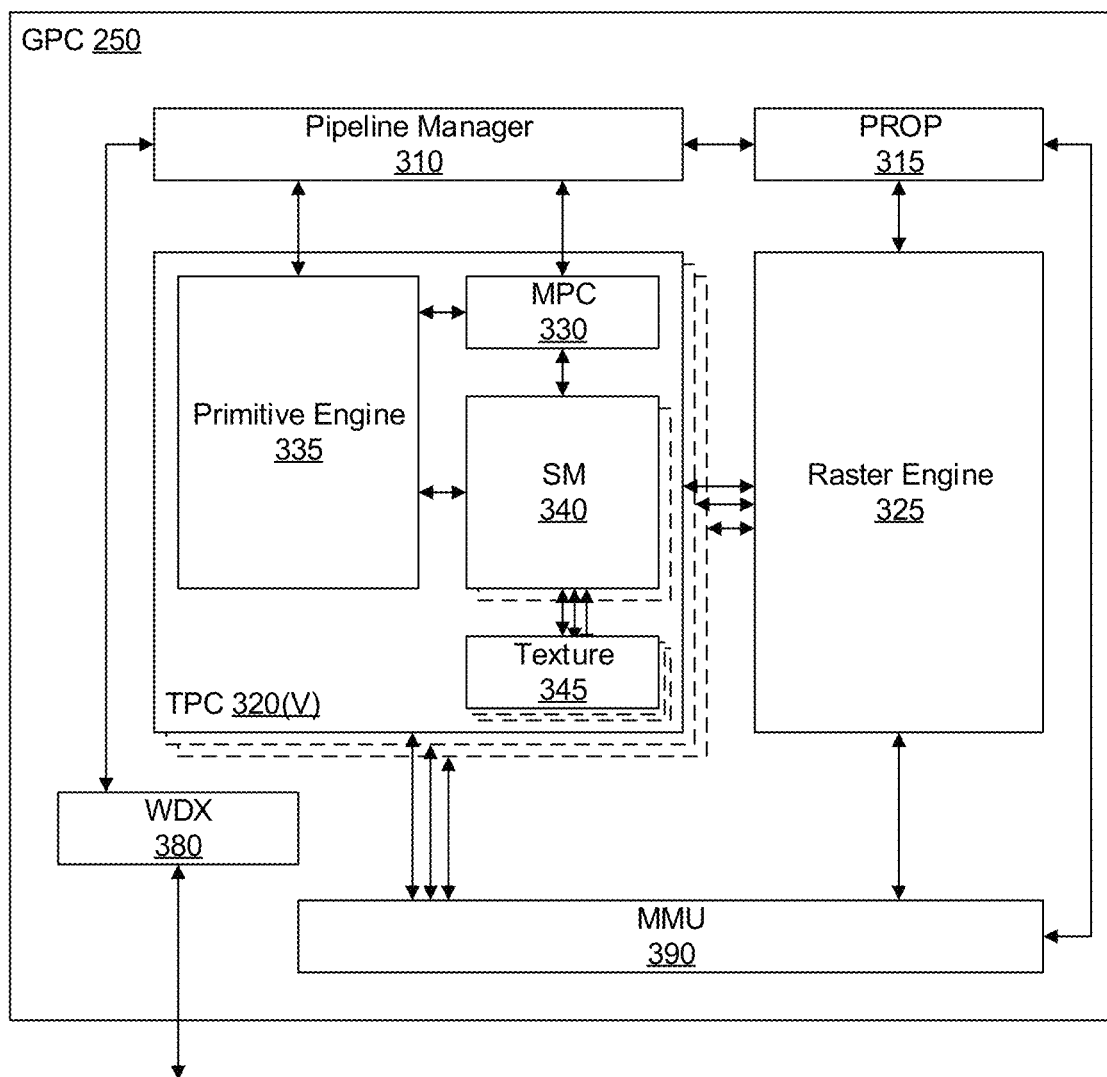
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
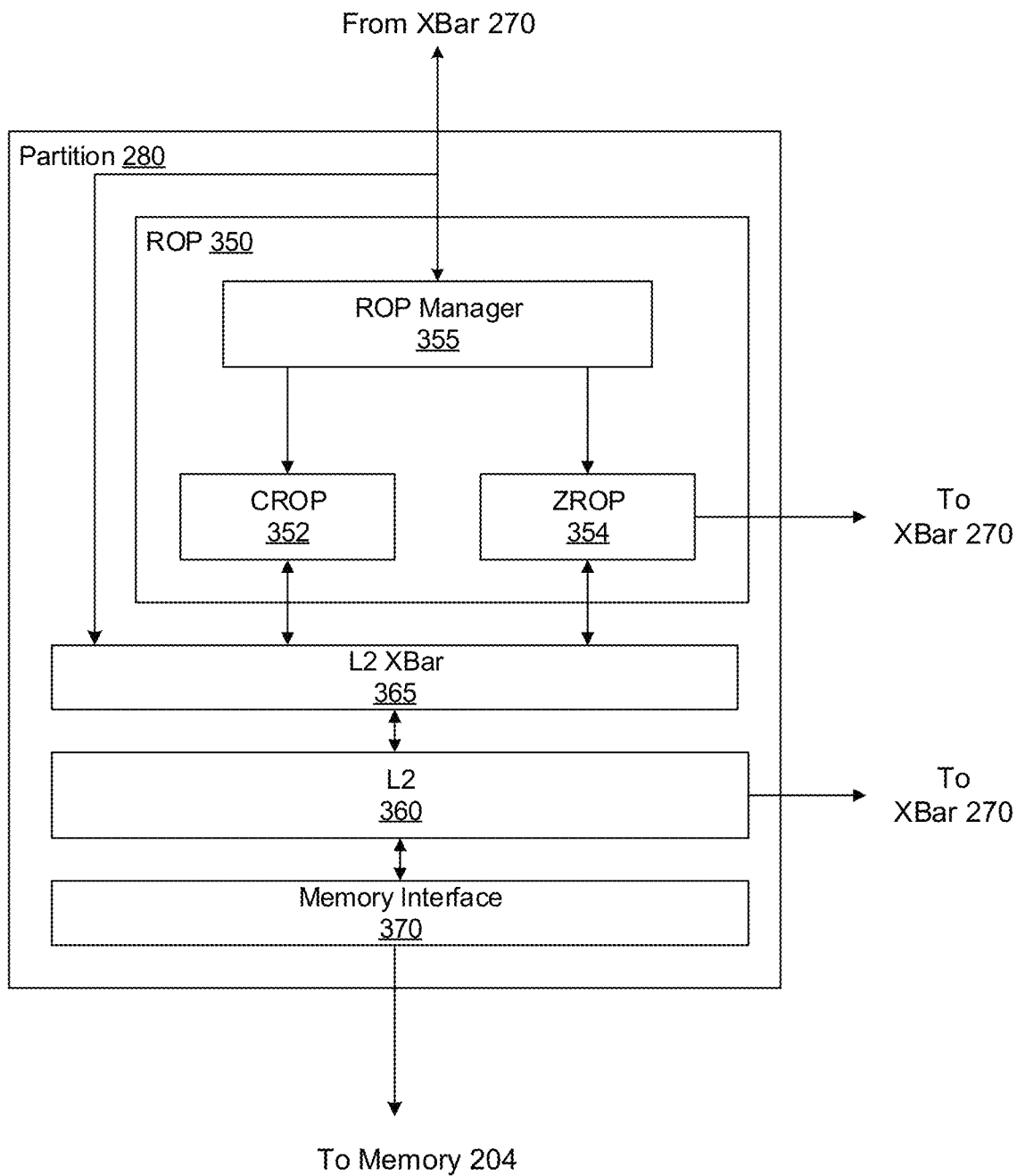
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
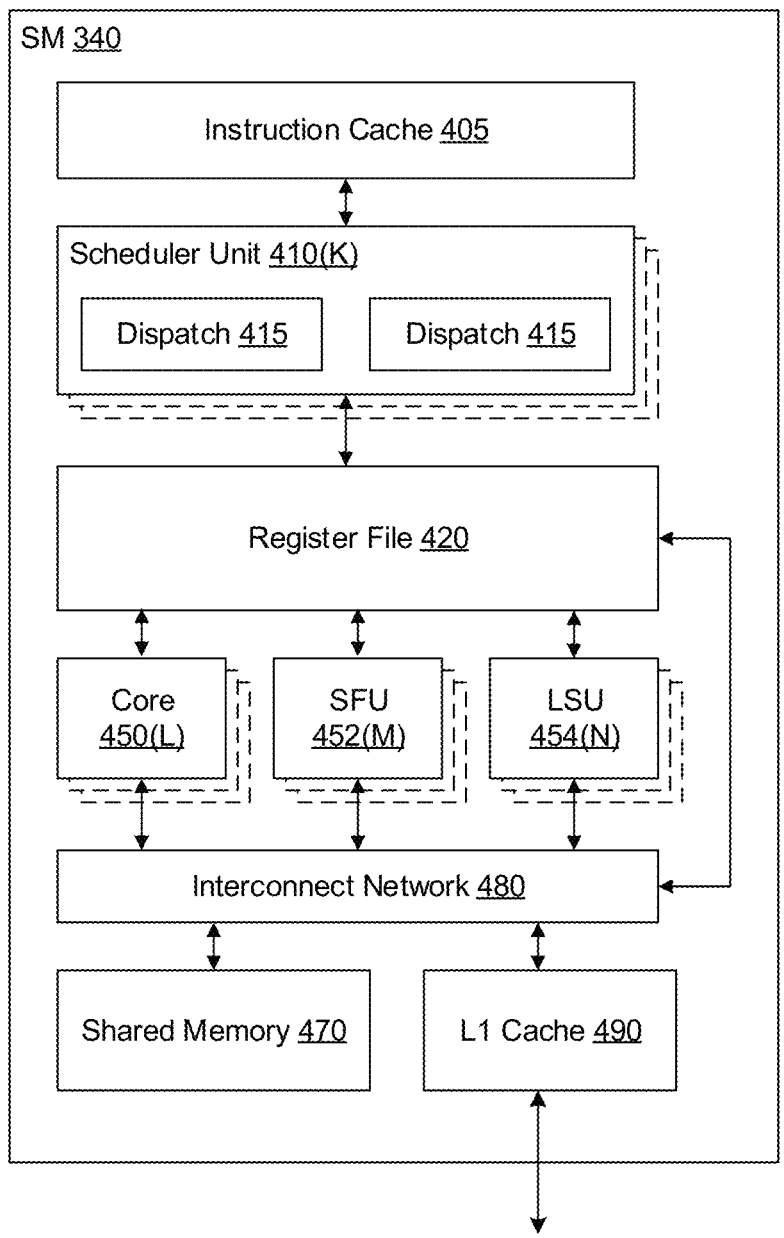
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
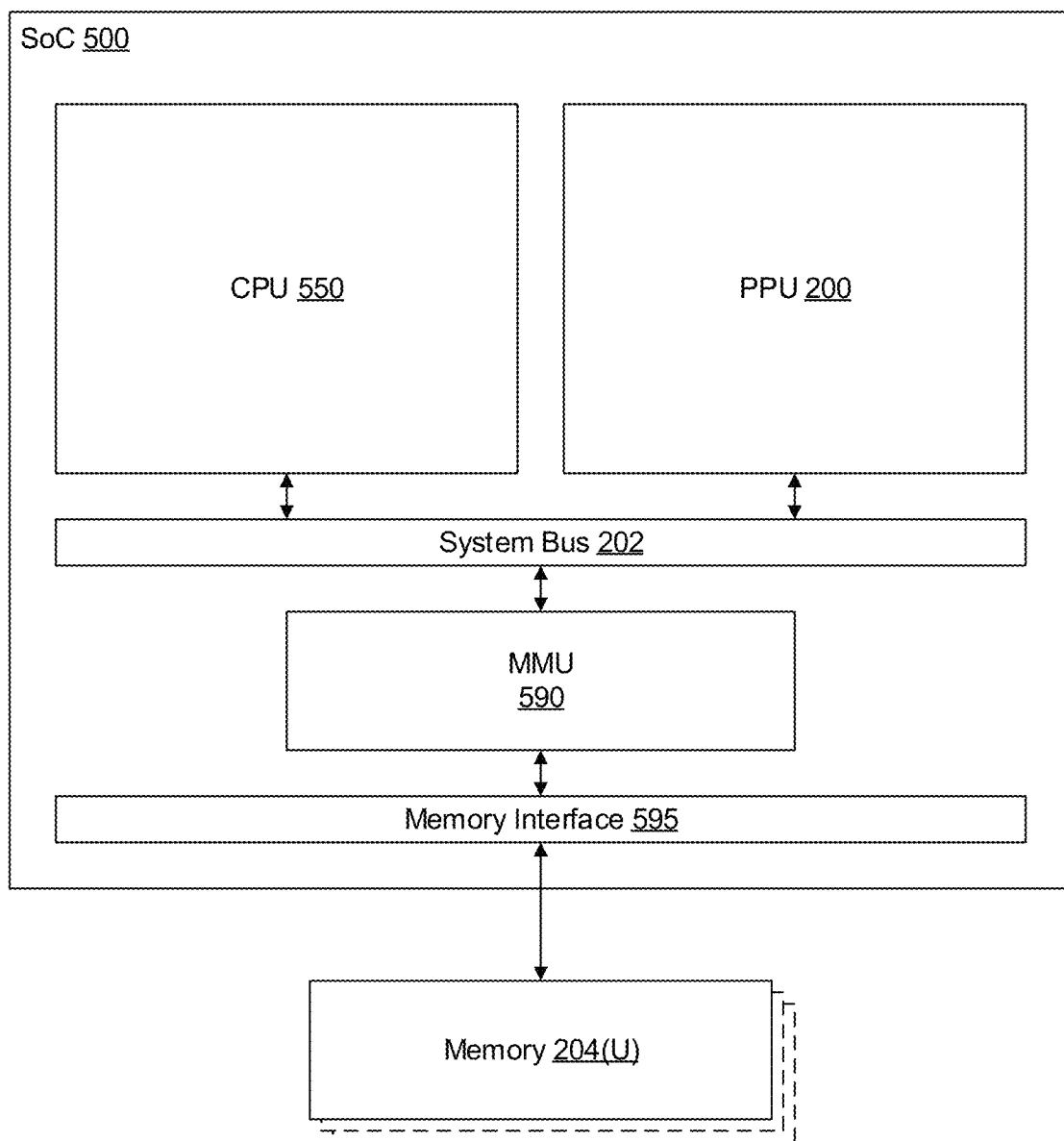
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
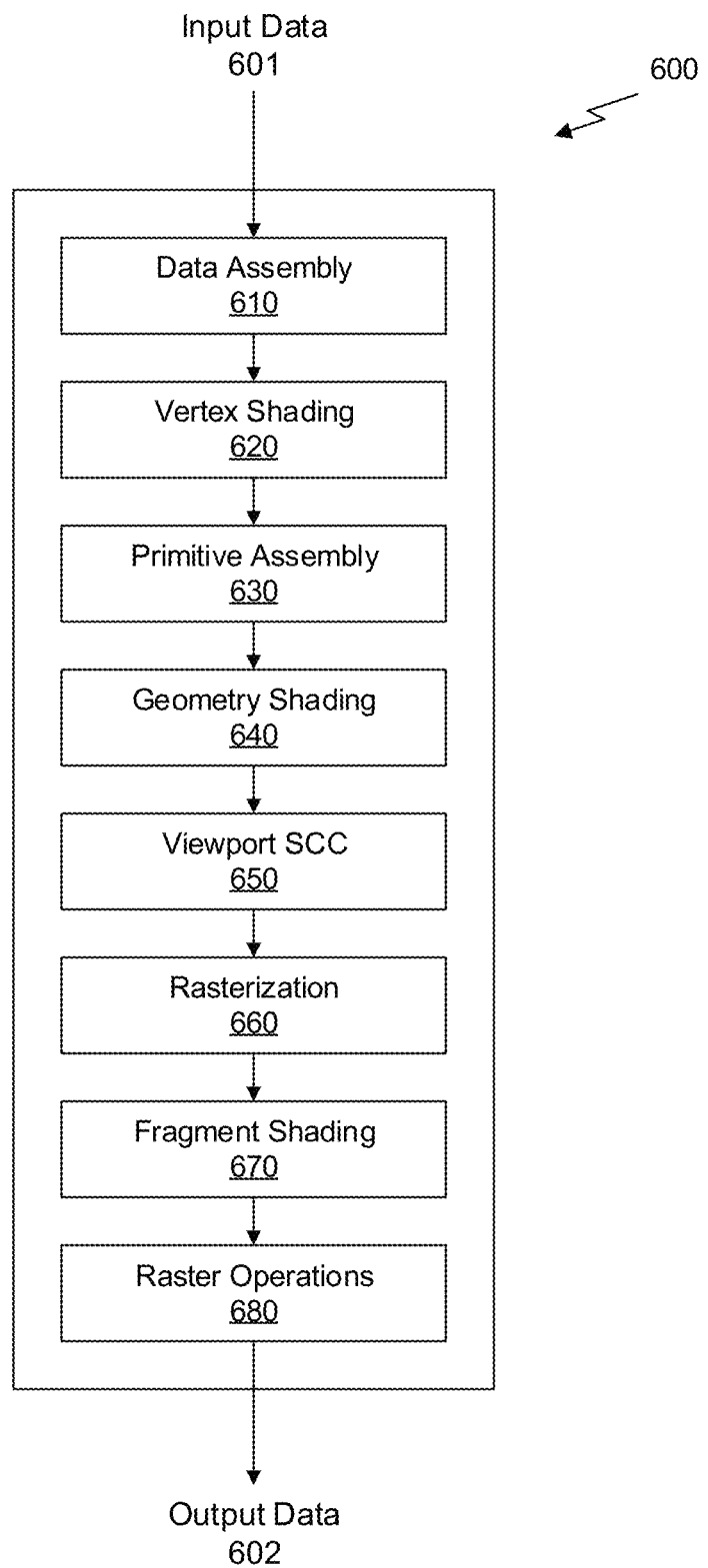
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Figure 7:
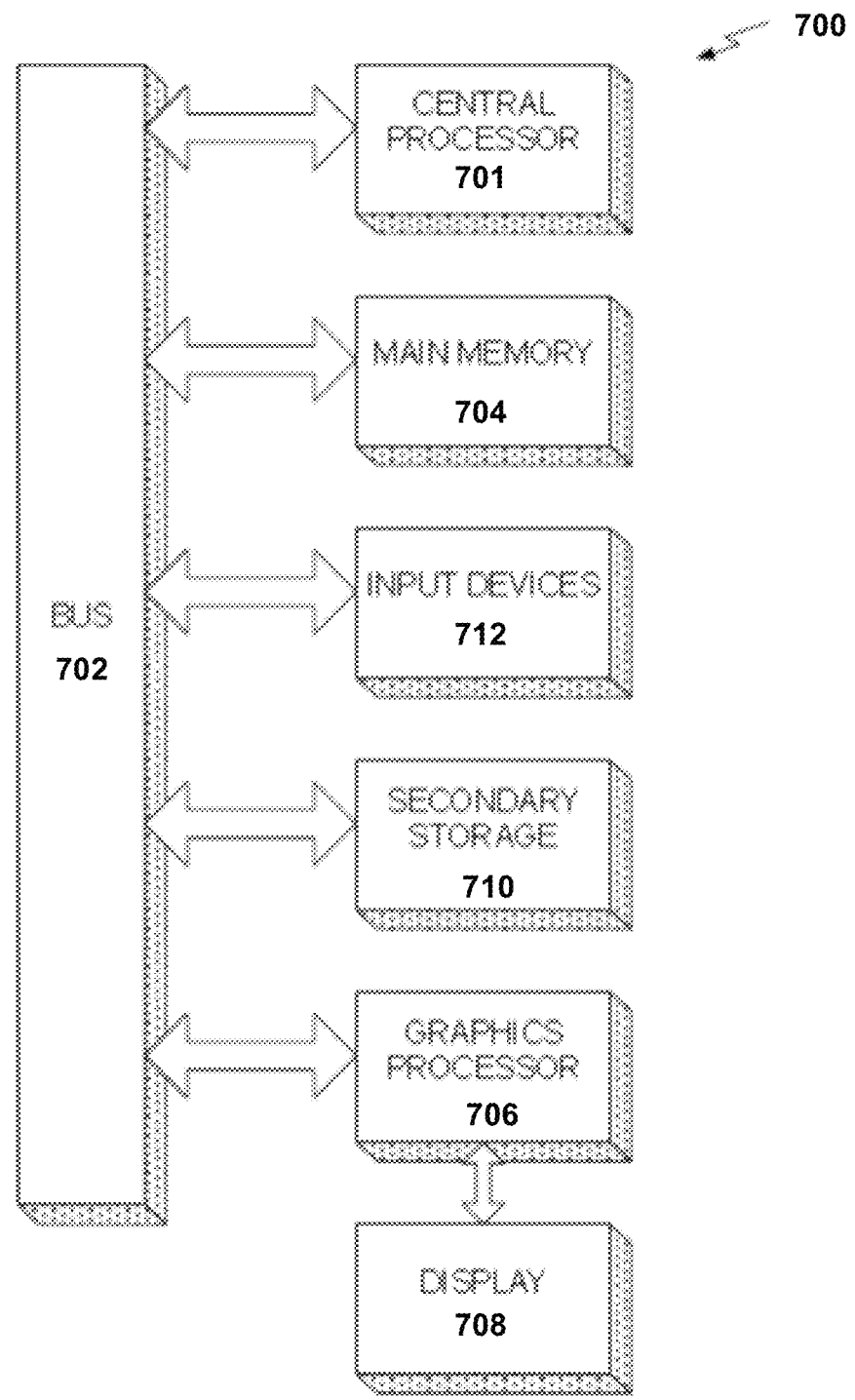
FIG. 7 illustrates an exemplary system in which the various architecture and/or functionality of all embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

Figure 8:
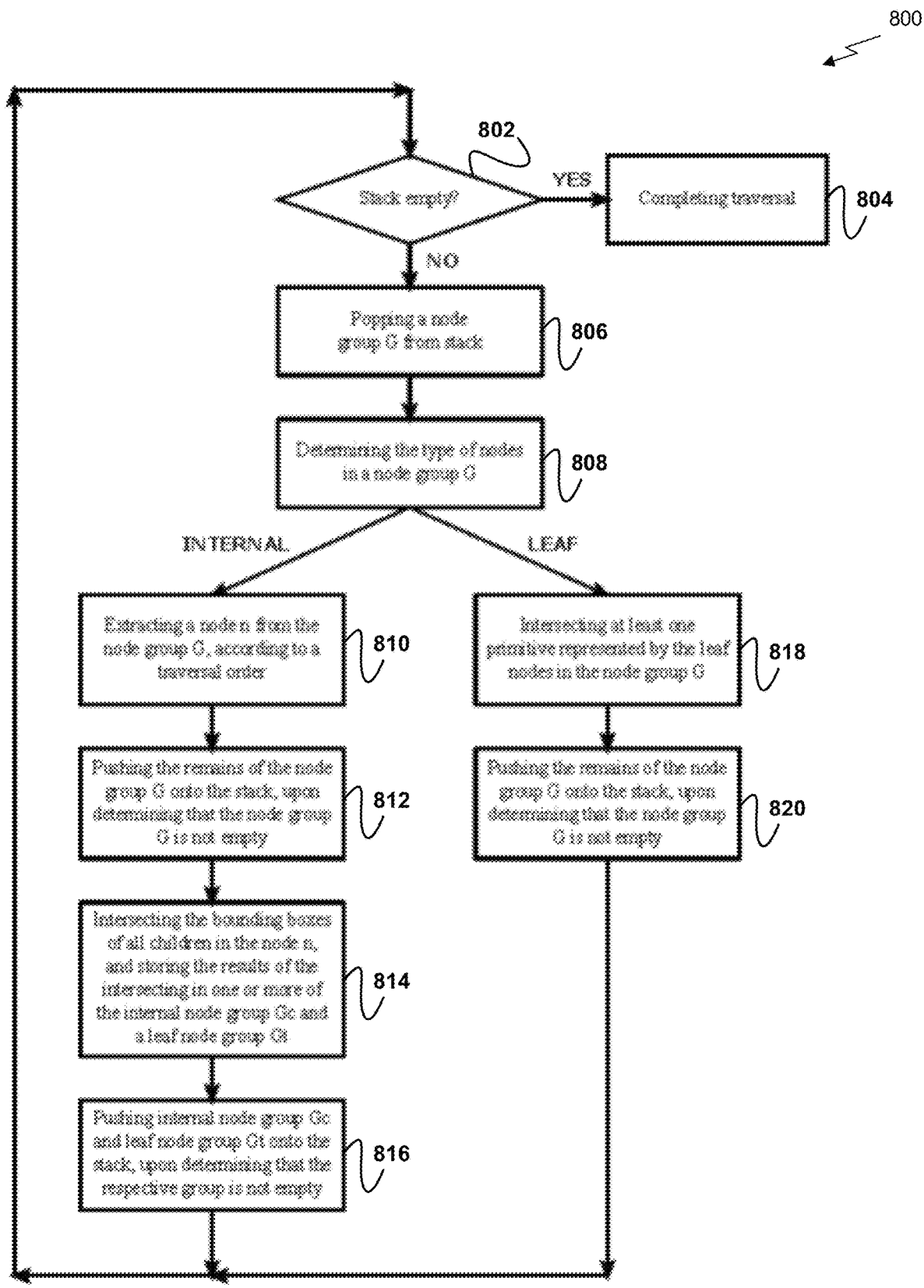
FIG. 8 illustrates a flowchart of a method for performing node traversal, utilizing compressed traversal stack entries, in accordance with one embodiment.

FIG. 8 illustrates a flowchart of a method 800 for performing node traversal, utilizing compressed traversal stack entries, in accordance with one embodiment. As shown in decision 802, it is determined whether a traversal stack is empty. If it is determined in decision 802 that the traversal stack is empty, then in operation 804 stack traversal is completed.

Additionally, if it is determined in decision 802 that the traversal stack is not empty, then in operation 806, a node group G is popped from the traversal stack. Additionally, in operation 808, the type of nodes in the node group G is determined. Further, as shown in operation 810, upon determining that the type of nodes in the node group G are internal nodes, a node n is extracted from the current node group G, according to a traversal order.

Further still, as shown in operation 812, upon determining that the node group G is not empty, the remains of the node group G are pushed onto the stack. Also, as shown in operation 814, the bounding boxes of all children in the node n are intersected, and results of the intersecting are stored in one or more of an internal node group Gc and a leaf node group Gt.

In addition, as shown in operation 816, upon determining that the internal node group Gc and the leaf node group Gt are not empty, the respective node group is pushed onto the stack. The method may then proceed with decision 802, where it is again determined whether a traversal stack is empty.

Furthermore, as shown in operation 818, upon determining that the type of nodes in the node group G are leaf nodes, at least one primitive represented by the leaf nodes in the node group G is intersected. Further still, as shown in operation 820, upon determining that the node group G is not empty, the remains of the node group G are pushed onto the stack. The method may then proceed with decision 802, where it is again determined whether a traversal stack is empty.

Further still, in one embodiment, some node groups may be cached into registers instead of stored in a stack across multiple loop iterations. For example, the top element of a stack may be stored in registers for faster access. Alternatively, the topmost element of both kinds (internal node group, leaf node group) may be stored in registers.

Additionally, in one embodiment, the processing of node groups may be reordered. For example, even if there is a leaf node group on top of the stack, it may be postponed, and the topmost internal node group may be processed instead. In another embodiment, a loop structure may be reorganized. For example, the loop may be unrolled a desired number of times. As another example, the conditional branches may be executed serially before repeating the loop.

Figure 9:
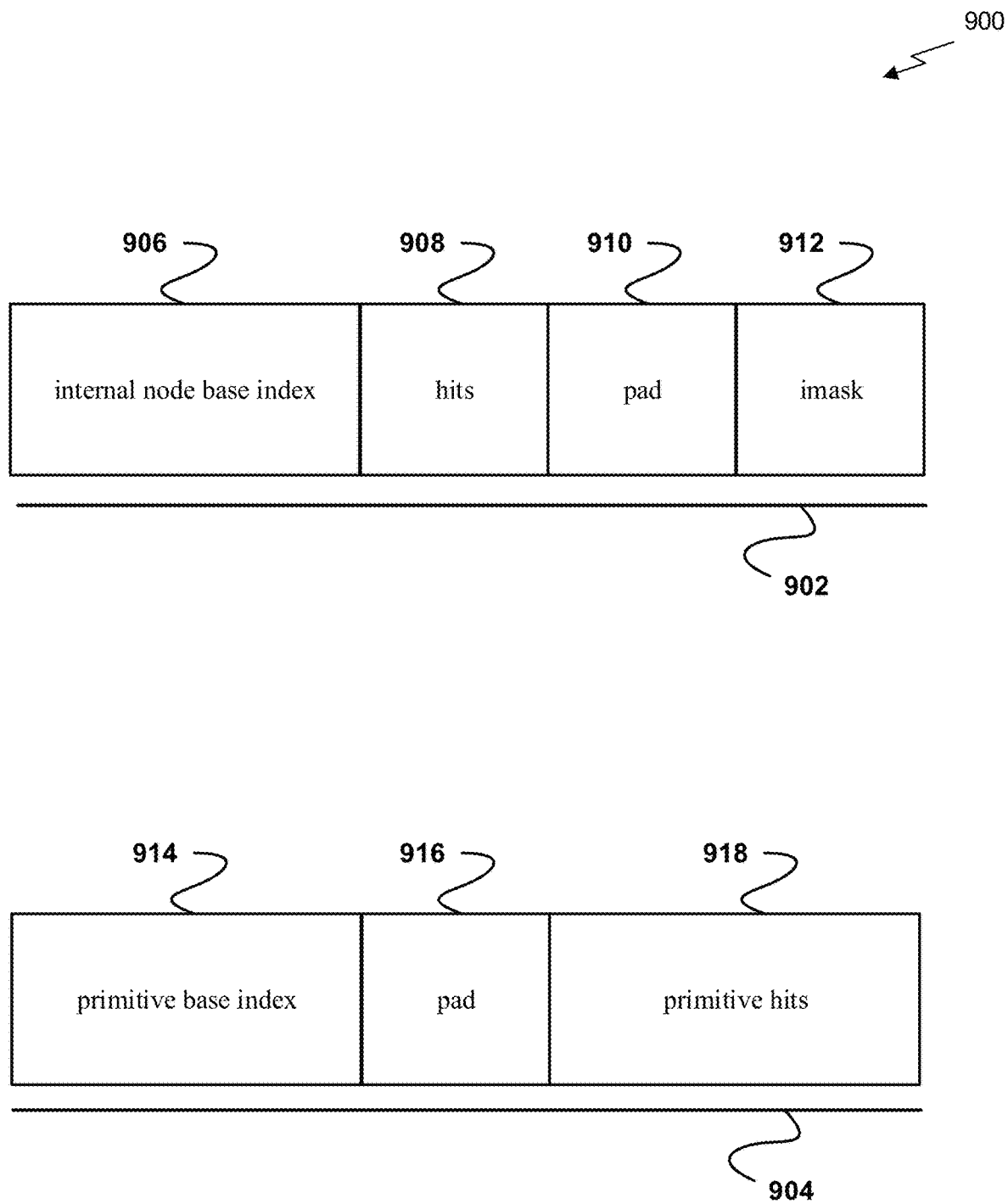
FIG. 9 illustrates exemplary traversal stack entries used during node traversal, in accordance with one embodiment.

FIG. 9 illustrates exemplary traversal stack entries 900 used during node traversal, according to one embodiment. As shown, an internal node group entry 902 includes an internal node base index 906, a hits field 908, a padding field 910, and an imask field 912. Also, a primitive node group entry 904 includes a primitive base index 914, a padding field 916, and a primitive hits field 918.

In one embodiment, a current node group G may be stored in the internal node group entry 902, and a primitive group Gt may be stored in the primitive node group entry 904. The internal node base index 906 of the internal node group entry 902 stores a base index to the internal node, and the primitive base index 914 of the primitive node group entry 904 stores a base index for the primitive.

Additionally, the hits field 908 of the internal node group entry 902 stores a bit mask indicating which internal nodes are active (e.g., whose bounding boxes have been intersected, and which have not yet been processed). The primitive hits field 918 of the primitive node group entry 904 stores a bit mask indicating which primitive nodes are active (e.g., whose bounding boxes have been intersected, and which have not yet been processed).

Further, the imask field 912 of the internal node group entry 902 indicates which of the children are internal nodes within the internal node group entry 902. In one embodiment, in order to differentiate between the internal node group entry 902 and the primitive node group entry 904, predetermined bits corresponding to the hits field 908 are checked. If the predetermined bits have a value of zero, then the entry is a primitive node group entry 904; otherwise, the entry is an internal node group entry 902.

Further still, in one embodiment, bits in the hits field 908 may be reordered according to priority with respect to a traversal order. For example, child nodes within a current node group G that are to be traversed first are represented by highest bits, and child nodes a current node group G that are to be traversed last are represented by lowest bits. As a result, the next active child to traverse is the highest set bit in the hits field 908.

As will be appreciated by a person skilled in the art, the exemplary stack entry encoding allows locating in memory a node to be processed next without consulting any information generated during the traversal besides the stack entry in question. Furthermore, it will be appreciated that the encoding accomplishes stack compression because multiple intersected nodes are referenced through a single base index instead of storing a separate index for each intersected node.

Efficient Incoherent Ray Traversal on GPUs Through Compressed Wide BVHs

Overview

A GPU-based ray traversal algorithm is provided that operates on compressed wide BVHs and maintains the traversal stack in a compressed format. This method may reduce the amount of memory traffic, which may improve incoherent ray traversal performance. Furthermore, the memory consumption of the BVH may be reduced.

Introduction

Ray casting continues to be an important primitive operation with applications in realistic computer graphics, scientific visualization, and simulation. The evolution of both CPU and GPU hardware has sparked a lot of research investigating how to implement ray casting most efficiently on modern hardware. One focus may be on incoherent rays, as they may be taxing workloads for GPU ray casting, and may be the predominant case in high-quality rendering.

The current implementation demonstrates a significant improvement in incoherent ray cast performance, as well as reduced memory usage. The discrepancy between available computational power and memory latency and bandwidth makes it possible to improve performance by trading more computation for reduced memory traffic. One exemplary approach is to compress both the acceleration structure and the traversal stack.

One exemplary compressed acceleration structure is an 8-wide BVH, and a novel algorithm is implemented for constructing it. Specifically, a binary BVH may be built using a builder, and the binary BVH may be converted into an 8-wide BVH in a SAH-optimal fashion. Octant-aware fixed-order traversal may be used, as well as an improved method for ordering the child nodes at build time to obtain a better traversal order.

Compressed Wide BVH

In one embodiment, an acceleration structure may include a compressed 8-wide BVH that uses axis-aligned bounding boxes (AABBs) as the bounding volumes. The high branching factor may amortize the memory fetch latencies over 8 bounding box intersection tests, and may increase instruction level parallelism during internal node tests.

Both bounding boxes and child pointers may be compressed so that the internal nodes require only ten bytes per child, which may obtain a 1:3.2 compression ratio compared to the standard uncompressed BVH node format. This may provide an immediate reduction in the amount of memory traffic. Secondarily, thanks to the small memory footprint, more nodes may fit in the GPU caches, which may further reduce the most expensive DRAM traffic.

Child Bounding Box Compression

In one embodiment, child node AABBs may be quantized to a local grid and locations of the AABB planes may be stored with a small number of bits. Specifically, given the common bounding box $B_{lo}$, $B_{hi}$ that covers all children, the origin point of the local grid $p=B_{lo}$ may be stored as three floating-point values. The coordinates of the child AABBs may be stored as unsigned integers using $N_q=8$ bits per plane. The scale of the grid on each axis $i \in \{x, y, z\}$ may be constrained to be a power of two $2^{e_i}$, where $e_i$ is chosen to be the smallest integer that allows representing the maximum plane of the common AABB in $N_q$ bits without overflow, i.e., $B_{hi, i} \leq p_i + 2^{e_i}(2^{B_q}-1)$. From this constraint, the following may be obtained $$e_i = \left\lceil \log_2 \frac{B_{hi,i} - p_i}{2^{N_q} - 1} \right\rceil. \quad (1)$$

To cover the full floating-point range, each exponent e may be stored using 8 bits. The child AABBs $b_{lo}$, $b_{hi}$ may now be quantized into $q_{lo}$, $q_{hi}$, as $$q_{lo,i} = \lfloor (b_{lo,i} - p_i)/2^{e_i} \rfloor$$

$$q_{hi,i} = \lceil (b_{hi,i} - p_i)/2^{e_i} \rceil \quad (2)$$

with decompression back to world space being:

$$b'_{lo,i} = p_i + 2^{e_i} q_{lo,i}$$

$$b'_{hi,i} = p_i + 2^{e_i} q_{hi,i} \quad (3)$$

for each axis i. The process may be conservative as the child AABBs may only be enlarged, i.e., $b'_{lo, i} \leq b_{lo, i}$ and $b'_{hi, i} \geq b_{hi, i}$.

This implementation may differ from previous methods by storing all information required to decompress the child bounding boxes in the node itself. In this way, no additional data may need to be stored in the traversal stack, which may allow more compact storage of the stack entries. The local grid data may total 15 bytes per node: three 32-bit floating-point numbers for p and three 8-bit exponents $e_i$.

Using lower precision for the quantized bounding boxes may lead to false positive ray-box intersections, as the boxes are conservatively enlarged in Equation 2. Nq=8 bits may be used to facilitate efficient decompression, but with lower precision the number of ray-box and ray-triangle tests may start rising rapidly.

Octant-Based Traversal Order

In one embodiment, sorting the ray-AABB hits by hit distance may be expensive for wide BVHs. A sorting network may require 19 compare-and-swap operations for 8 child nodes, whereas sorting only the hits may lead to problematic SIMT execution divergence. Therefore, a pre-computed or fixed-order traversal that does not depend on the actual intersection distances may be used. To keep the memory usage at minimum, the traversal order may be encoded implicitly in the order in which the children are stored in the node, thereby consuming no additional memory.

One exemplary implementation may include determining the child node traversal order based on the signs of the ray direction vector, i.e., ray octant. In the original scheme, the child nodes may be stored in memory in Morton order according to their AABB centroids, which is a natural traversal order for rays with all-positive direction vector. The octant is most conveniently represented as a 3-bit code oct $\in [0, 7]$, where zeros indicate positive traversal direction and ones indicate negative traversal direction. Now, traversing the children $i \in [0, 7]$ in order (i XOR oct) may results in a desirable ordering for any ray octant.

Figure 10:
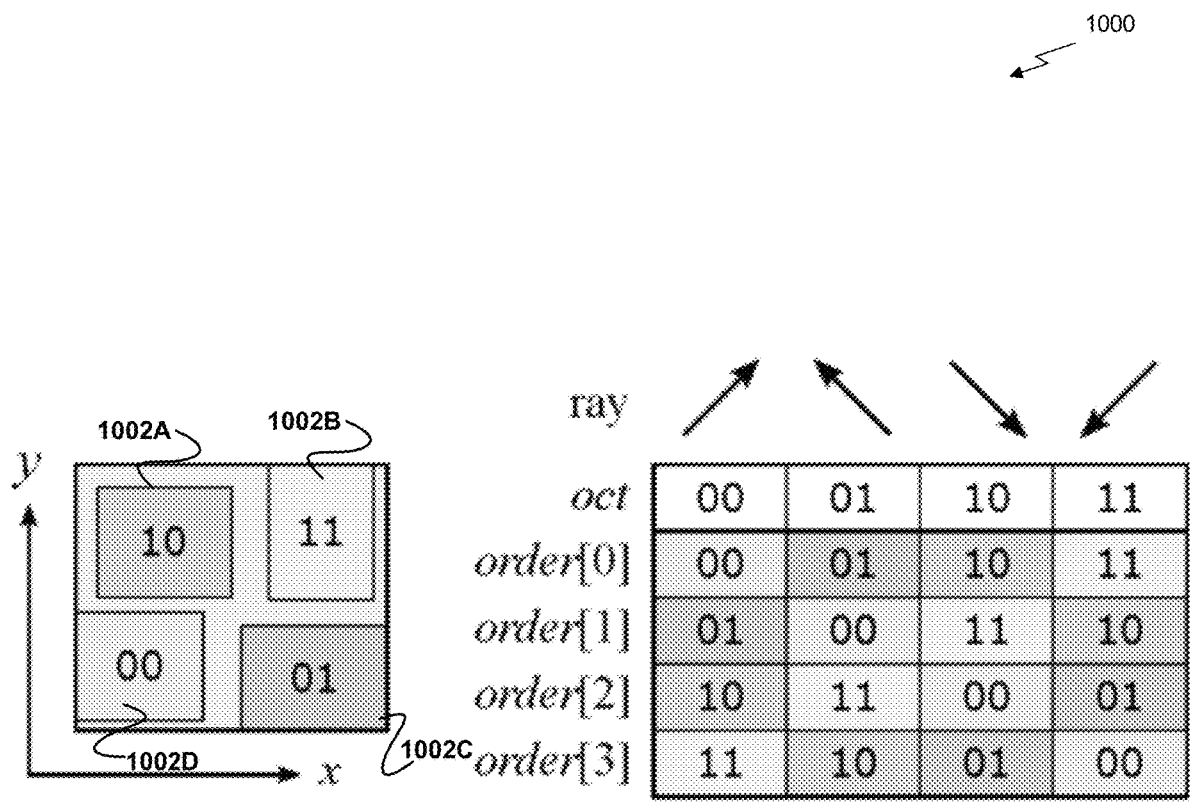
FIG. 10 illustrates an exemplary XOR-based traversal order in two dimensions, in accordance with one embodiment.

FIG. 10 illustrates an exemplary XOR-based traversal order 1000 in two dimensions, according to one embodiment. As shown, four child nodes 1002A-D are stored in memory in Morton order according to their centroids. The order in which the intersected children are traversed is determined by the ray octant by the simple formula order [i]=i XOR oct.

Storing the child nodes in Morton order works properly when the child AABBs are located approximately at the corners of the parent AABB and there are 8 child nodes to be stored. The current algorithm employs the same octant-based traversal order, but at build time the order in which the children are stored in memory is optimized. This makes this approach readily applicable to nodes with fewer than 8 children.

Memory Layout

Figure 11:
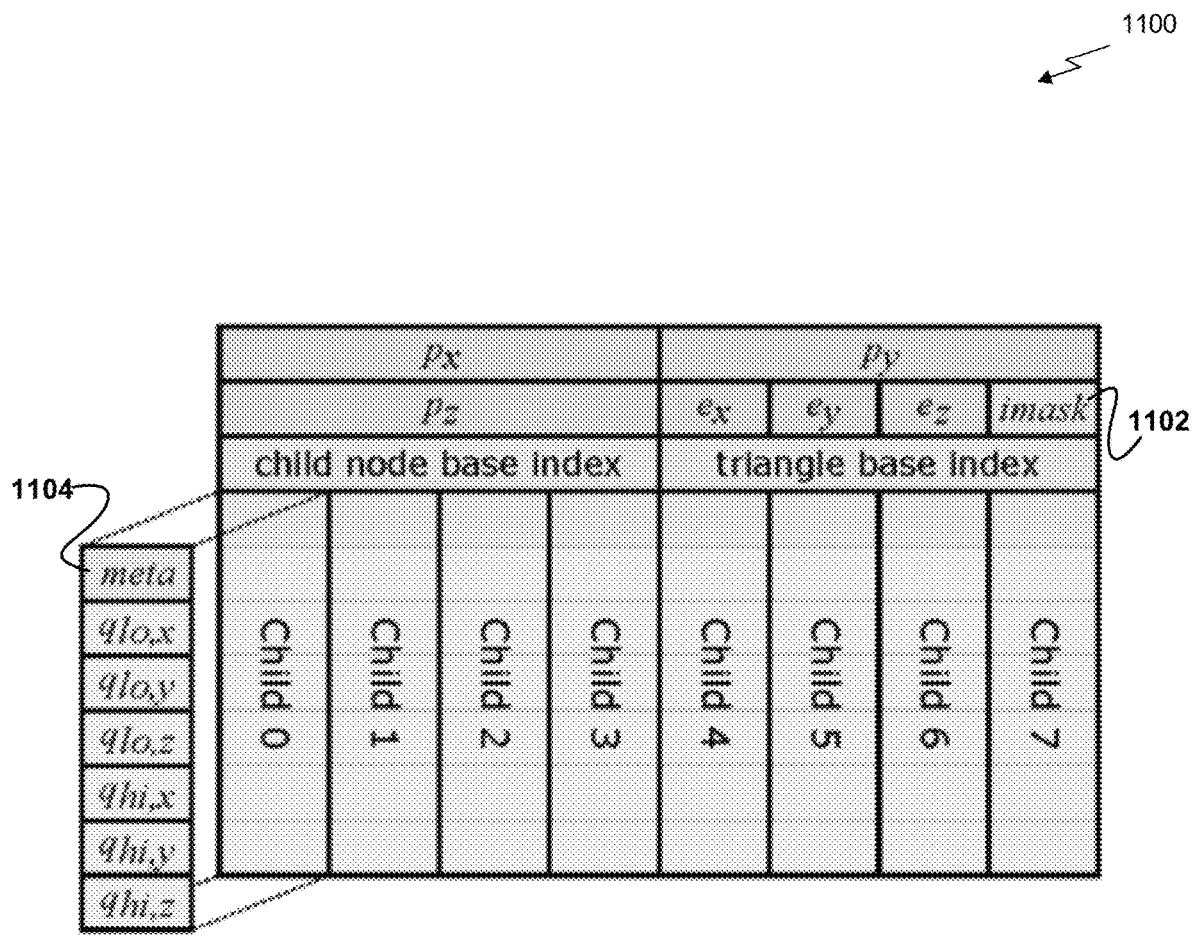
FIG. 11 illustrates an exemplary memory layout, in accordance with one embodiment.

In one embodiment, the internal nodes may store the bounding boxes of their children and the information necessary to locate them in memory. FIG. 11 illustrates an exemplary memory layout 1100, according to one embodiment. Leaf nodes may be represented directly as ranges in a separate triangle array, i.e., there may be no explicit node structure associated with them. Each internal node may store 8 quantized bounding boxes and the local coordinate grid information that is needed for decompression.

In addition, each internal node may store the indices of the first referenced child node and the first referenced triangle in their respective arrays. All child nodes referenced by the same parent may be stored contiguously in memory, and the same may apply to the triangles as well. For the benchmarks, these node and triangle clusters may be sorted in depth-first order, the method may not depend on such global ordering for correctness. Additionally, each node may store an 8-bit imask field 1102 to indicate which of the children are internal nodes, and a per-child 8-bit meta field 1104 that encodes the indexing information needed to find the corresponding node or triangle range in the corresponding array.

The contents of the 8-bit meta field may be determined as follows:

Empty child slot: The field is set to 00000000
Internal node: The high 3 bits are set to 001 while the low 5 bits store the child slot index plus 24 (i.e., the values range in 24 . . . 31).
Leaf node: The high 3 bits stores the number of triangles using unary encoding, and the low 5 bits store the index of first triangle relative to the triangle base index (ranging in 0 . . . 23).

Figure 12:
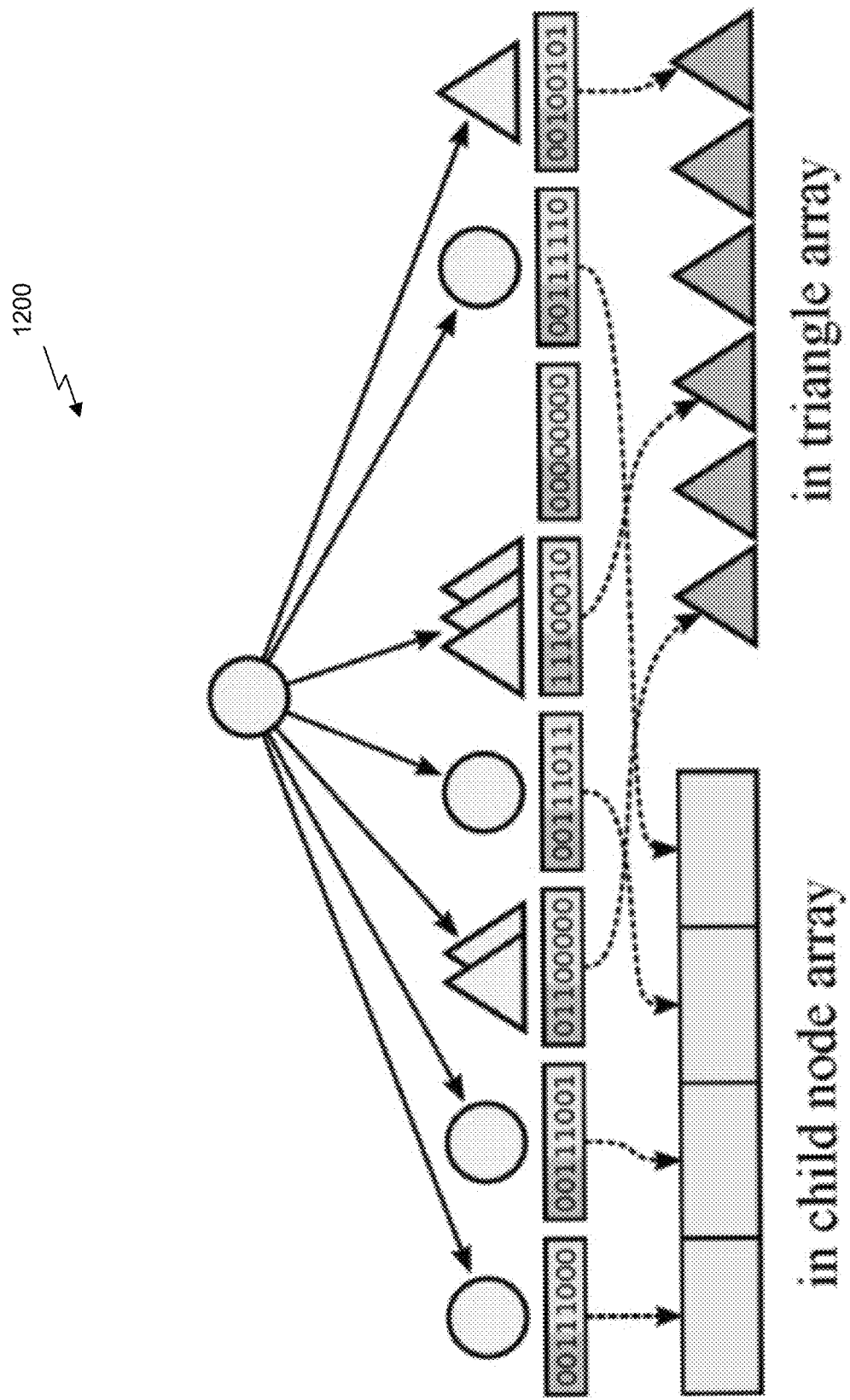
FIG. 12 illustrates an exemplary encoding, in accordance with one embodiment.

FIG. 12 illustrates an exemplary encoding 1200, according to one embodiment. Variable leaf size of up to 3 triangles may be supported, as well as nodes with fewer than 8 children, while maintaining full flexibility in terms of child ordering. In one embodiment, the contents of the meta field for internal nodes may be reconstructed on the fly, as the node type is known from the imask field, and the slot index is the index of the child node in the parent node. Also, the leaf nodes may store the triangle count in 2 bits instead of 3 by storing the number of triangles instead of one bit per triangle. The exemplary encoding may allow efficient parallel processing of child node indexing data by employing 32-bit arithmetic.

In one embodiment, the triangles may be stored using a simple format that directly represents the vertices as 32-bit floats and is padded to 48 bytes. This leaves 12 bytes per triangle for storing, e.g., the original triangle index in the input mesh.

Optimal Wide BVH Construction

In one embodiment, the wide BVH may be built by first constructing a standard binary BVH and then collapsing its nodes into wide nodes in a SAH-optimal fashion. The topology of the resulting wide BVH may be constrained by the topology of the initial binary BVH, and the SAH cost may be minimized under this constraint.

The initial binary BVH may be built using a SBVH algorithm with one primitive per leaf. This may yield a high-quality binary BVH with controllable amount of spatial triangle splitting. To convert the binary BVH into a wide BVH, a dynamic programming approach may be used. For example, both internal nodes and leaf nodes may be jointly optimized at the same time, reaching a global optimum with respect to them both.

One goal of the construction may be to minimize the total SAH cost [15, 20] of the resulting wide BVH:

$$SAH = \sum_{n \in I} A_n \cdot c_{node} + \sum_{n \in L} A_n \cdot P_n \cdot c_{prim}, \quad (4)$$

where I and L correspond to the set of internal nodes and the set of leaf nodes, respectively, $A_n$ is the AABB surface area of node n expressed relative to the surface area of the root, $P_n$ is the number of primitives in leaf node n, and $c_{node}$ and $c_{prim}$ are constants that represent the cost of ray-node test and ray-triangle test, respectively.

Equation 4 may be minimized by computing and storing, for each node n in the binary BVH, the optimal SAH cost $C(n, i)$ that may be achieved if the contents of the entire subtree of n were represented as a forest of at most i wide BVHs. Only $i \in [1, 7]$ may be considered for the purposes of an 8-wide BVH construction. After computation, the optimal SAH cost of the entire hierarchy may be represented as a single wide BVH may be available at C(root, 1). The actual construction of the wide BVH may be performed after the cost computation pass is finished.

The cost computation may be done in a bottom-up fashion in the binary hierarchy, i.e., a node may be processed only after both of its children have been processed. This may ensure that the calculations that depend on the children of the node may be performed without recursion. At the leaves of the binary BVH, each containing one primitive, $C(n, i) = A_n \cdot c_{prime}$ for all $i \in [1, 7]$. At the internal nodes, cost $C(n, i)$ may be calculated as follows:

$$C(n, i) = \begin{cases} \min(C_{leaf}(n), C_{internal}(n)) & \text{if } i = 1 \\ \min(C_{distribute}(n, i), C(n, i-1)) & \text{otherwise} \end{cases} \quad (5)$$

The first case corresponds to creating a new wide BVH node to serve as the root of the subtree at n, and either a leaf node or an internal node may be created. The second case corresponds to creating a forest with up to i roots, and an optimal way to distribute these roots into left and right subtree of n may be determined. Alternatively, fewer than i roots may be created.

Creating a leaf node may be possible when there are few enough primitives in the subtree of n:

$$C_{leaf}(n) = \begin{cases} A_n \cdot P_n \cdot c_{prim} & \text{if } P_n \leq P_{max} \\ \infty & \text{otherwise} \end{cases} \quad (6)$$

Here $P_n$ represents the total number of primitives under node n and $P_{max}$ is the maximum allowed leaf size for the wide BVH.

Creating an internal node at n may require the selection of up to 8 descendant nodes to serve as its children. The minimum SAH cost of these nodes may be given by $C_{distribute}(n, 8)$, and the cost term associated with n itself may be added:

$$C_{internal}(n) = C_{distribute}(n, 8) + A_n \cdot c_{node} \quad (7)$$

Finally, function $C_{distribute}(n, j)$ may be defined to give the optimal cost of representing the entire subtree of n using a forest of at least two and at most j wide BVHs:

$$C_{distribute}(n, j) = \min_{0 < k < j} C(n_{left}, k) + C(n_{right}, j - k) \quad (8)$$

where $n_{left}$ and $n_{right}$ are the left and right child nodes of n. The minimum is taken over the different ways of distributing at most k of the roots in the left subtree of n, and at most j-k roots in the right subtree.

During the cost computation the decisions that yielded the optimal C(n, i) for each n and i may be stored. After the cost computation is complete, these decisions may be back-tracked starting from C(root, 1) wide BVH nodes may be created so that the optimal cost is realized. This may finish the topology construction of the wide BVH.

Child Node Ordering

In one embodiment, there may be no traversal order related data stored in the nodes, and the traversal order may be implicitly encoded into the order of the child nodes. Based on an octant-based traversal order, a conceptually simple optimization problem exists: one goal may be to ensure that, for all ray directions, the child nodes will be traversed in an order that matches the distance order as closely as possible.

In one embodiment, for each node, an 8×8 table cost(c, s) may be filled, where each table cell indicates the cost of placing a particular child node c in a particular child slot $s \in [0, 7]$. From this data, the assignment that minimizes the total cost may be found using an auction algorithm.

To define cost(c, s), a diagonal ray with direction $d_s = (\pm 1, \pm 1, \pm 1)$ may be considered that would traverse slot s first according to the octant order. The sign of the ith component of $d_s$ is based on the ith bit of s, so that zero corresponds to + and one corresponds to −.

The cost may be computed as the difference between the parent node centroid p and the child node centroid c, projected on this diagonal ray direction:

$$\text{cost}(c, s) = (c - p) \cdot d_s. \quad (9)$$

The costs for different child slots may be filled in by computing the projected distances with all eight sign combinations.

Traversal Algorithm

In one example, a BVH traversal algorithm may adopt the use of persistent threads and dynamic ray fetching based on SIMD utilization heuristics and may map each ray to a single CUDA thread. A compressed traversal stack may be used in which each entry may contain several children of an 8-wide BVH node. Memory traffic caused by the traversal stack has traditionally consumed a large part of available memory bandwidth on GPUs much of it may be removed through compression and the use of shared memory.

Table 1 includes exemplary pseudocode for traversing a single ray using a single CUDA thread, in accordance with one embodiment. The pseudocode does not reflect the use of persistent threads or dynamic ray fetching. Of course, it should be noted that the pseudocode shown in Table 1 is set forth for illustrative purposes only, and thus should not be construed as limiting in any manner.

TABLE 1

Algorithm 1 BVH traversal

```
1:   r ← FETCHRAY( )   // Origin, direction, t_min, and t_max
2:   S ← ∅             // Traversal stack of node and triangle groups
3:   G ← {root}        // Current node group
4:   loop
5:       if G represents a node group then
6:           n ← GETCLOSESTNODE(G, r)
7:           G ← G \ n
8:           if G ≠ ∅ then STACKPUSH(G, S)
9:           G, G_t ← INTERSECTCHILDREN(n, r)
10:      else // G represents a triangle group
11:          G_t ← G
12:          G ← ∅
13:      end if
14:      while G_t ≠ ∅
15:          if ratio of active threads is too low then
16:              STACKPUSH(G_t, S)
17:              break
18:          end if
19:          t ← GETNEXTTRIANGLE(G_t)
20:          G_t ← G_t \ t
21:          INTERSECTTRIANGLE(t, r)
22:      end while
23:      if G = ∅ then
24:          if S = ∅ then break // Traversal finished
25:          G ← STACKPOP(S)
26:      end if
27:  end loop
```

In one embodiment, the traversal stack S is initially empty, as we its top entry G, or current node group, is maintained in registers. Each stack entry may refer to one or more internal nodes referenced by the same parent, or one or more triangles referenced by one internal node. Internal nodes and triangles may not be mixed in the same group.

The main traversal loop begins on line 4 of Table 1. At the beginning of each iteration, the current node group G is checked for which kind of nodes it contains—by design, it is never empty between main loop iterations. If G contains internal nodes, node n that should be visited next is extracted according to the octant traversal order. If this does not make G empty, its remains are pushed back to the stack. On line 9 of Table 1 the bounding boxes of all children in node n are intersected, which may yield both internal and leaf node hits. These form two separate groups G and G_t for internal nodes and triangles, respectively.

Alternatively, if G consisted of triangles instead of internal nodes on line 5 of Table 1, its contents are moved to G_t on line 11 of Table 1 and G is cleared.

Next, the triangles in current triangle group G_t are intersected. Triangles are intersected in G_t until it becomes empty, or until the number of active threads in the warp falls below a threshold. In the latter case, the intersection of remaining triangles is postponed by pushing G_t to the stack on line 16 of Table 1.

Before continuing to the next iteration of the traversal loop, a new node group G is popped from the stack if necessary. If both G and the stack are empty, the traversal is finished.

Compressed Traversal Stack

Figure 13:
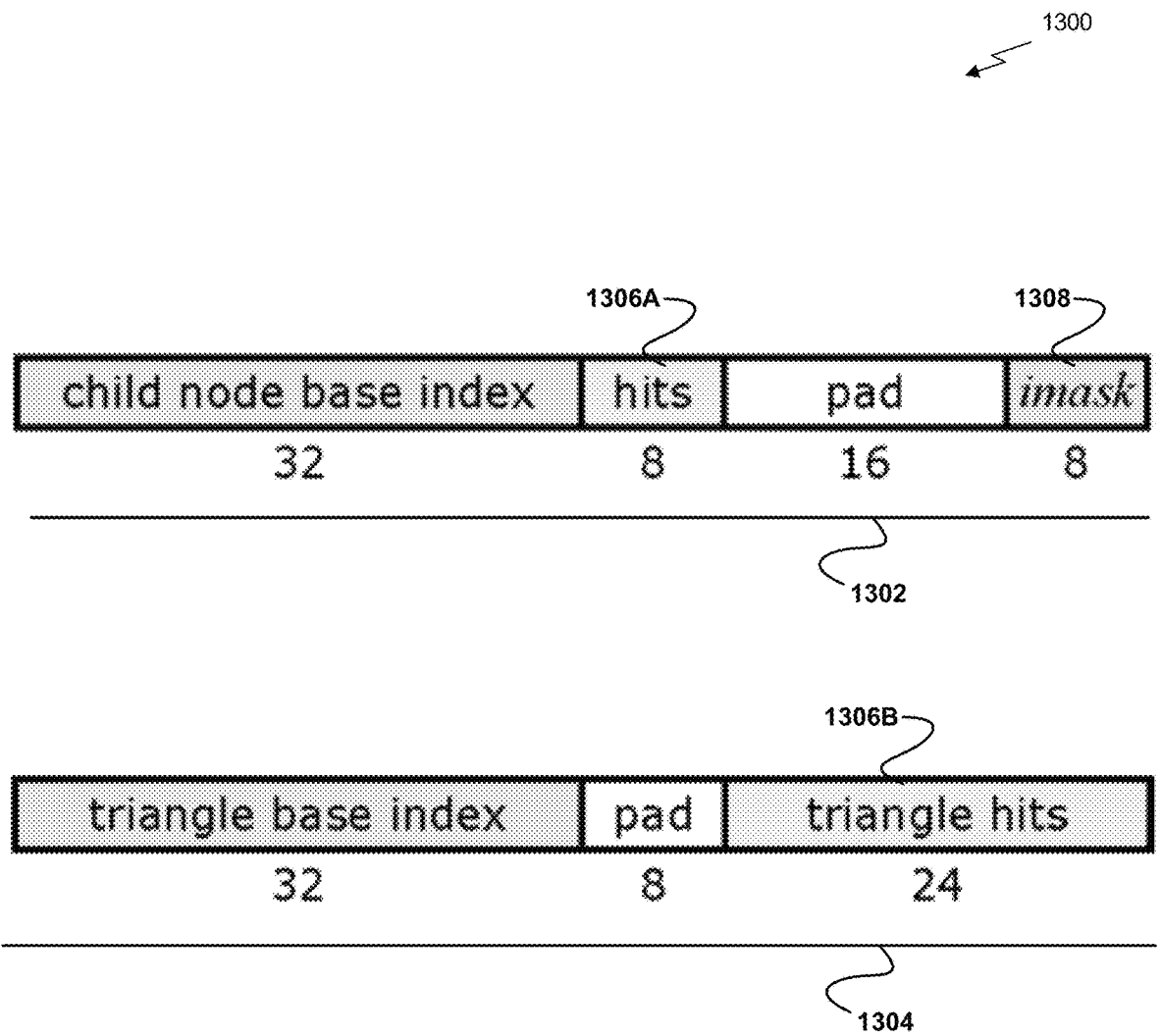
FIG. 13 illustrates an exemplary node group entry and an exemplary triangle group entry, in accordance with one embodiment.

The current node group G and triangle group G_t may be stored in a compressed format, and the same format may be used when groups are pushed into the stack. The current node group G may be stored as a 64-bit node group entry, and the current triangle group G_t may be stored as a 64-bit triangle group entry. FIG. 13 illustrates an exemplary node group entry 1302 and an exemplary triangle group entry 1304, according to one embodiment.

These entries 1302 and 1304 store the base index to internal nodes or triangles, as well as a bit mask 1306A and 1306B indicating which nodes or triangles are active, i.e., whose bounding boxes were intersected and which have not yet been processed. In addition, the imask field 1308 from the internal node is stored for the node group entries. To distinguish between the two types when executing a stack pop, bits 24-31 (the byte occupied by the hits field for node entries) may be examined. If this byte is zero, it may be determined that the entry is a triangle group entry. Otherwise, it is a node group entry.

In one embodiment, the bits in the hits field of the node group entry may be reordered according to their priority with respect to the octant-based traversal order. In other words, the children that should be traversed first may be represented by the highest bits while the children that should be traversed last may be represented by the lowest bits. This allows for a determination of the next active child to traverse by finding the highest set bit in this field. In order to determine the corresponding child slot index, the bit index may be XORed with (7-oct).

To reduce external memory traffic during traversal, the first N stack entries may be stored in SM-local shared memory. Because the amount of shared memory is limited, it may not accommodate the entire stack in all situations, and thus thread-local memory may also be used when the shared memory stack capacity is exceeded. In one exemplary implementation, at most 12 stack entries (96 bytes) may be stored in shared memory per thread without reducing the number of simultaneously active threads. As each level in the hierarchy produces 0-2 stack entries, 12 entries may be sufficient and spilling may happen rarely.

Node Decompression and Intersection

In one embodiment, both internal nodes and triangles may be loaded through the cache hierarchy using 128-bit wide vector load instructions.

Instead of transforming the quantized bounding boxes to world space, the 8-bit plane positions may be converted directly to floating-point values, and the ray origin o and direction d may be transformed to account for the quantization grid origin and scale. In one embodiment, any byte in a 32-bit word may be converted into a floating-point value with a single instruction. For each axis $i \in \{x, y, z\}$, the ray may be adjusted as follows:

$$d'_i = 2^{e_i}/d_i$$

$$o'_i = (p_i - o_i)/d_i \tag{10}$$

After this, the ray-plane intersection distances may be computed with a single FMA instruction per plane:

$$t_{lo,i} = q_{lo,i} d'_i + o'_i$$

$$t_{hi,i} = q_{hi,i} d'_i + o'_i \tag{11}$$

In one embodiment, VMIN, VMAX instructions may be used for efficient 3-way minimum and maximum in the intersection test. PRMT instruction may also be used to select the near and far planes of 4 quantized boxes at once before the test, depending on ray octant.

Traversal State Management

In addition to box decompression and intersection, the IntersectChildren function on line 9 of Table 1 is also responsible for traversal order computations and forming the traversal stack entries. For example, the traversal order computations may be performed in packed form for 4 children at once.

To construct the hits field of the node group entry in accordance to the octant traversal order, the traversal priority (slot_index ^(7-oct)) may be computed for each child that corresponds to an internal node. Using C syntax, the computation is done for 4 children in parallel as follows:

octinv4=(7-oct)*0x01010101;
is_inner4=(meta4& (meta4<<1)) & 0x10101010;
inner_mask4=sign_extend_s8x4(is_inner4<<3);
bit_index4=(meta4^(octinv4 & inner_mask4)) & 0x1F1F1F1F;

Here each variable with a postfix 4 contains data for 4 different child nodes. The calculation of is_inner4 exploits the fact that bits 3 and 4 are set simultaneously only for internal nodes due to the biasing of meta by 24. Function sign_extend_s8x4, implemented using the PRMT instruction, sign extends each byte in a 32-bit word individually with a single assembly instruction, producing a byte mask for the internal nodes. In the end, each byte of bit_index4 contains the traversal priority, biased by 24, for internal nodes, and the triangle offset for leaf nodes.

Conveniently, the bytes in bit_index4 now indicate directly where bits should be set in the hits and triangle hits fields in node and triangle group entries for G and $G_t$. Remembering that the highest 3 meta bits are 001 for internal nodes and contain one bit per triangle for leaf nodes, the hits and triangle hits fields may be constructed in G and $G_t$ simultaneously, without considering which type the child node is, by shifting the top 3 meta bits to the position indicated by the corresponding byte in bit_index4. Furthermore, a non-existent child node has 000 as the high 3 bits of meta, so this operation may not insert bits in either field. Using C syntax again, the high 3 bits in meta fields may be moved to start from a lowest bit position, child_bits4= (meta4>>5) & 0x07070707 and then a given child may be inserted in the hits and triangle hits fields as follows:

```
if (intersected) {
    child_bits  = extract_byte(child_bits4, slot_index % 4);
    bit_index   = extract_byte(bit_index4, slot_index % 4);
    hitmask     = hitmask | (child_bits << bit_index);
}
```

Loop unrolling may be used to replicate the same operation for each of the 8 child slots. The entire body of the if statement maps to a single PTX instruction vshl.u32.u32.u32.wrap.add r0,r1.b,r2.b,r3 which in turn compiles to a single assembly instruction.

Obtaining the closest internal node in G on line 6 of Table 1 works as follows: the index of the highest set bit is found in the hits field of the node group entry, and the bit is cleared to remove the node. The corresponding child slot index is found by subtracting the bias of 24 and reversing the traversal priority computation: slot_index=(bit_index -24)^ (7-oct). A relative index of the node is then obtained by computing the number of neighboring nodes stored in the lower child slots: relative_index= popc(imask & ~(-1<<slot_index)). Selecting an active triangle from $G_t$ on line 19 is simpler, as the index of each set bit in triangle hits directly indicates the relative index of the triangle.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for implementing a compressed traversal stack, comprising:
   traversing a hierarchical data structure having a subset of nodes with each node in the subset having two or more children; and
   during the traversing:
   creating a single stack entry associated with a select node in the subset of nodes, wherein the single stack entry represents a group of intersected child nodes and indicates a plurality of intersected child nodes of the select node that are included in the group of intersected child nodes, and
   adding the single stack entry to a compressed traversal stack stored in a memory.

2. The method of claim 1, wherein the intersected child nodes are determined by selecting the node in the subset of nodes, and intersecting bounding boxes of all children in the select node.

3. The method of claim 2, wherein the node is selected based on a predetermined traversal order.

4. The method of claim 1, wherein a plurality of different stack entries are created during the traversing.

5. The method of claim 1, wherein the single stack entry includes an internal node group entry that represents a group of intersected internal nodes, the group of intersected internal nodes including a plurality of intersected internal nodes referenced by a single parent.

6. The method of claim 1, wherein the single stack entry includes a primitive node group entry that represents a group of intersected leaf node, the group of intersected leaf nodes including a plurality of intersected leaf nodes referenced by one internal node.

7. The method of claim 1, further comprising creating another stack entry for each distinct primitive type that is intersected.

8. The method of claim 1, wherein the single stack entry includes a base index to a node within the hierarchical data structure.

9. The method of claim 1, wherein a bit mask of the single stack entry indicates the plurality of intersected child nodes included in the group of intersected child nodes and a plurality of nodes that have not yet been processed.

10. The method of claim 5, wherein the internal node group entry includes a bit mask indicating a type of each child node included in the plurality of intersected child nodes.

11. The method of claim 5, wherein the internal node group entry includes a hits field that represents children to be traversed in a predetermined traversal order.

12. The method of claim 1, further comprising, during a hierarchical data structure traversal, locating a node to be processed next using only a current stack entry.

13. The method of claim 1, wherein the compressed traversal stack implements stack compression by referencing the plurality of intersected child nodes in the single stack entry of the compressed traversal stack utilizing a shared base index.

14. A system comprising:
a processor that is configured to:
traverse a hierarchical data structure having a subset of nodes with each node in the subset having two or more children; and
during the traversing:
create a single stack entry associated with a select node in the subset of nodes, wherein the single stack entry represents a group of intersected child nodes and indicates a plurality of intersected child nodes of the select node that are included in the group of intersected child nodes, and
add the single stack entry to a compressed traversal stack stored in a memory.

15. The system of claim 14, wherein the intersected child nodes are determined by selecting the node in the subset of nodes, and intersecting bounding boxes of all children in the select node.

16. The system of claim 15, wherein the node is selected based on a predetermined traversal order.

17. The system of claim 14, wherein a plurality of different stack entries are created during the traversing.

18. The system of claim 14, wherein the single stack entry includes an internal node group entry that represents a group of intersected internal nodes, the group of intersected internal nodes including a plurality of intersected internal nodes referenced by a single parent.

19. The system of claim 14, wherein the single stack entry includes a primitive node group entry that represents a group of intersected leaf node, the group of intersected leaf nodes including a plurality of intersected leaf nodes referenced by one internal node.

20. A computer-readable storage medium storing instructions that, when executed by a processor, causes the processor to perform steps comprising:
traversing a hierarchical data structure having a subset of nodes with each node in the subset having two or more children; and
during the traversing:
creating a single stack entry-associated with a select node in the subset of nodes, wherein the single stack entry represents a group of intersected child nodes and indicates a plurality of intersected child nodes of the select node that are included in the group of intersected child nodes, and
adding the single stack entry to a compressed traversal stack stored in a memory.

* * * * *